(12) United States Patent
Iannuzzi

(10) Patent No.: US 12,119,783 B2
(45) Date of Patent: Oct. 15, 2024

(54) PHOTOVOLTAIC SYSTEM

(71) Applicant: Maurizio Iannuzzi, Reggio Emilia (IT)

(72) Inventor: Maurizio Iannuzzi, Reggio Emilia (IT)

(*) Notice: Subject to any disclaimer, the term of this patent is extended or adjusted under 35 U.S.C. 154(b) by 160 days.

(21) Appl. No.: 18/054,079

(22) Filed: Nov. 9, 2022

(65) Prior Publication Data
US 2024/0154569 A1 May 9, 2024

(51) Int. Cl.
*E04D 13/18* (2018.01)
*H02S 20/10* (2014.01)
*H02S 30/10* (2014.01)

(52) U.S. Cl.
CPC .............. *H02S 30/10* (2014.12); *H02S 20/10* (2014.12)

(58) Field of Classification Search
CPC .................................. H02S 30/10; H02S 20/10
See application file for complete search history.

(56) References Cited

U.S. PATENT DOCUMENTS

| | | | |
|---|---|---|---|
| 7,921,843 B1 | 4/2011 | Rawlings | |
| 8,893,445 B2* | 11/2014 | Yen | H02S 20/30 52/173.3 |
| 9,093,948 B2* | 7/2015 | Walz | H02S 20/24 |
| 9,628,019 B1* | 4/2017 | Atcha | F24S 25/632 |
| 9,800,201 B1* | 10/2017 | Atcha | F24S 25/16 |
| 10,033,328 B2* | 7/2018 | Wildes | F24S 25/16 |
| 2010/0147359 A1 | 6/2010 | Harberts et al. | |
| 2012/0318322 A1* | 12/2012 | Lanyon | F24S 25/70 136/244 |
| 2014/0069484 A1* | 3/2014 | Kuan | F24S 40/85 136/251 |
| 2020/0266755 A1* | 8/2020 | Dick | F24S 25/634 |
| 2022/0173690 A1* | 6/2022 | Dick | F24S 25/11 |

FOREIGN PATENT DOCUMENTS

WO 2018071332 A1 4/2018

OTHER PUBLICATIONS

European Search Report as issued in connection with European Patent Application No. 21210656, dated May 12, 2022.

* cited by examiner

*Primary Examiner* — Basil S Katcheves
(74) *Attorney, Agent, or Firm* — Maschoff Brennan

(57) ABSTRACT

A photovoltaic system includes photovoltaic panels arranged in a row. The photovoltaic panels may include at least a first photovoltaic panel and a second photovoltaic panel. The photovoltaic system may further include support ballasts supporting the photovoltaic panels and a connection system configured to mutually connect at least one group of said ballasts. The connection system may include a concrete fairlead conduit.

13 Claims, 4 Drawing Sheets

PHOTOVOLTAIC SYSTEM

FIELD

The present invention relates to a photovoltaic system, in particular a photovoltaic system with support ballasts supporting the photovoltaic panels.

BACKGROUND

Systems provided with concrete ballasts arranged in a row, mutually spaced apart and which in pairs support opposite sides of the panels are known. In order to increase wind resistance and stiffen the structure of the system, these ballasts are joined by a metal bar to which concrete weights are in turn applied.

This solution is not free from drawbacks. In particular, this metal bar under the action of the wind and of the ballasts applied thereto risks deforming over time. Furthermore, although it is usually made of galvanised metal, over time it can be subject to corrosion phenomena (since it is a bar that performs an important function of stiffening and increasing structural rigidity, this is particularly negative).

SUMMARY

A photovoltaic system includes photovoltaic panels arranged in a row. The photovoltaic panels may include at least a first photovoltaic panel and a second photovoltaic panel. The photovoltaic system may further include support ballasts supporting the photovoltaic panels and a connection system configured to mutually connect at least one group of said ballasts. The connection system may include a concrete fairlead conduit.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
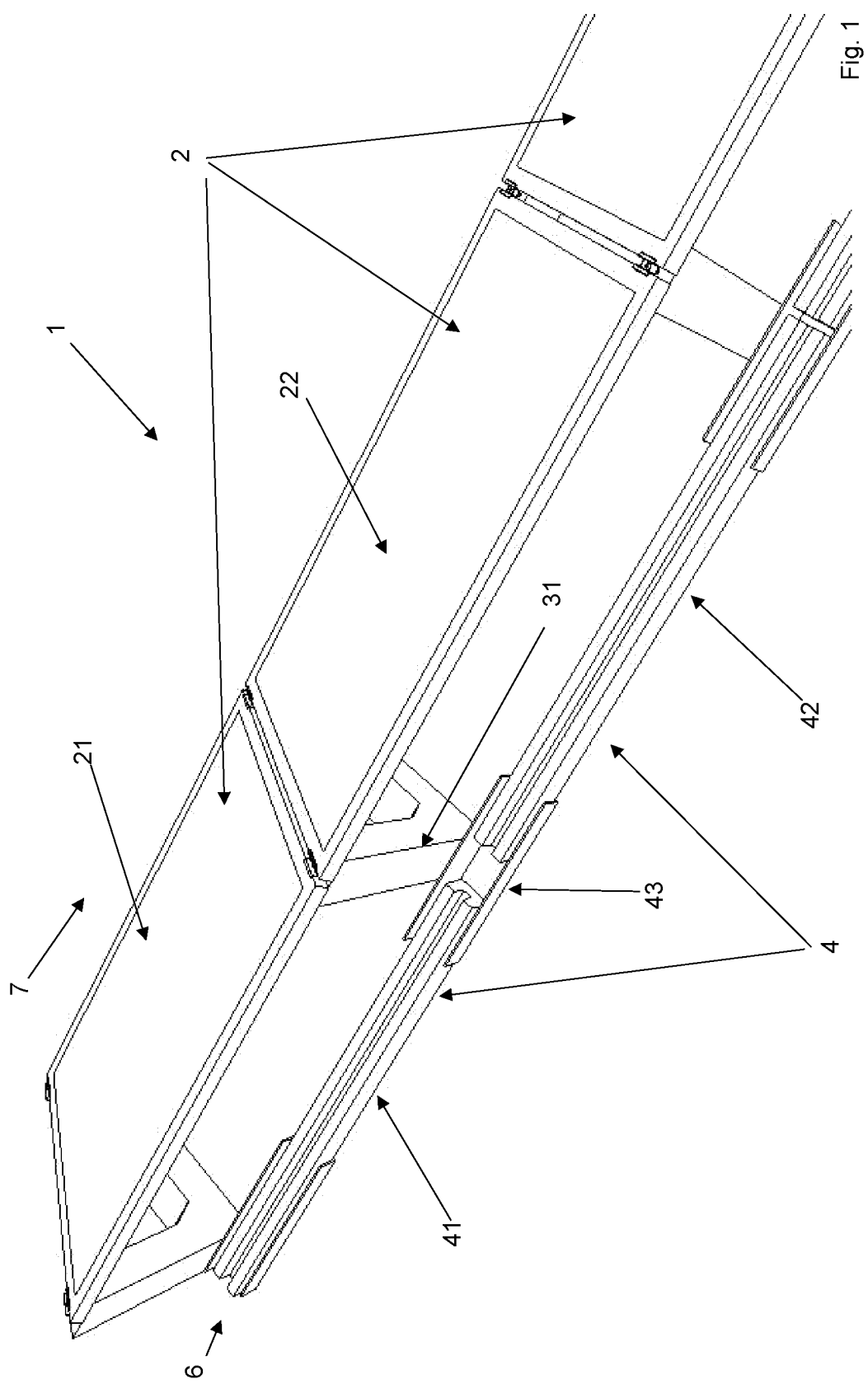
FIGS. 1-3 show perspective views of a photovoltaic system.
Figure 2:
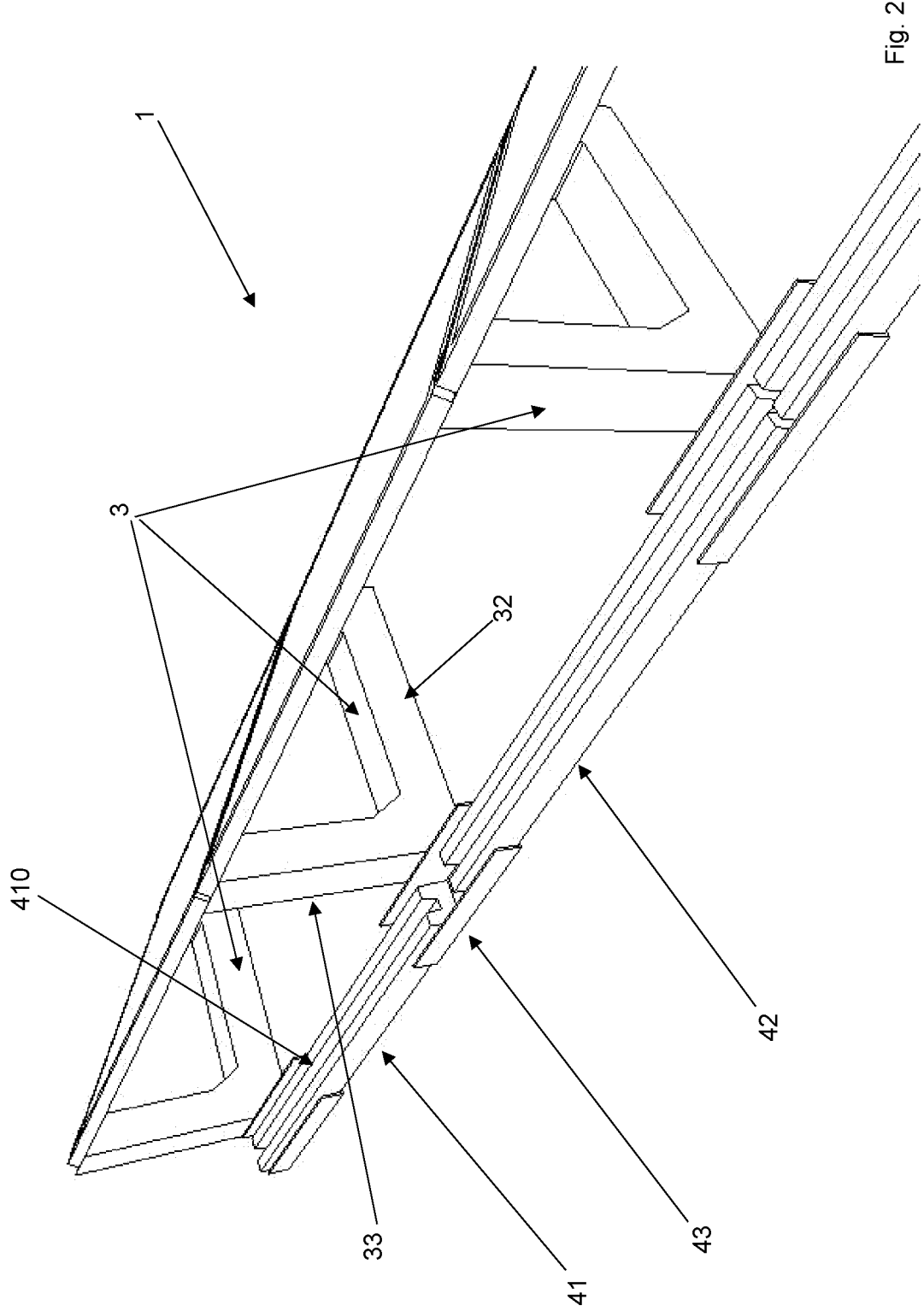
Figure 3:
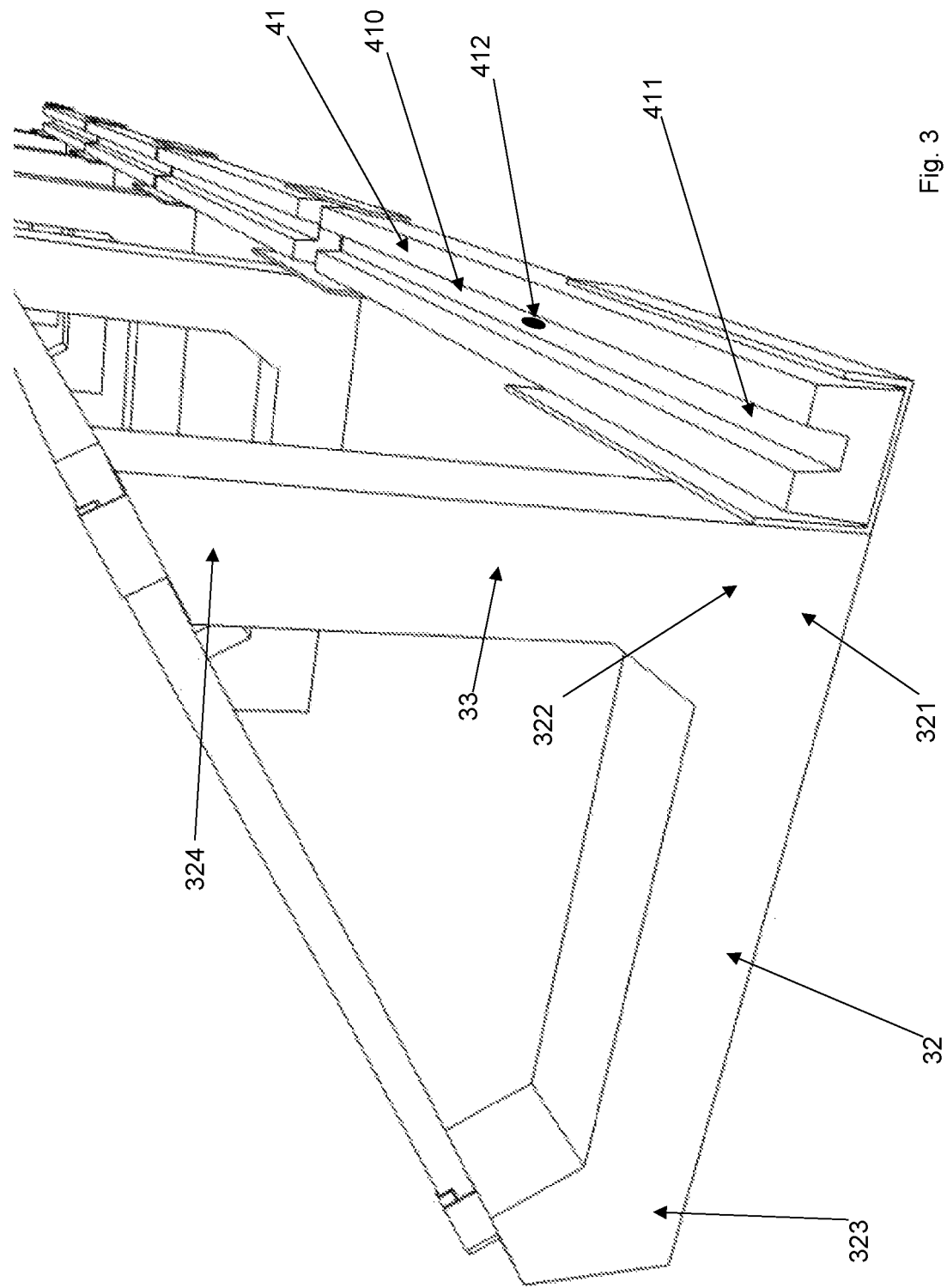
Figure 4:
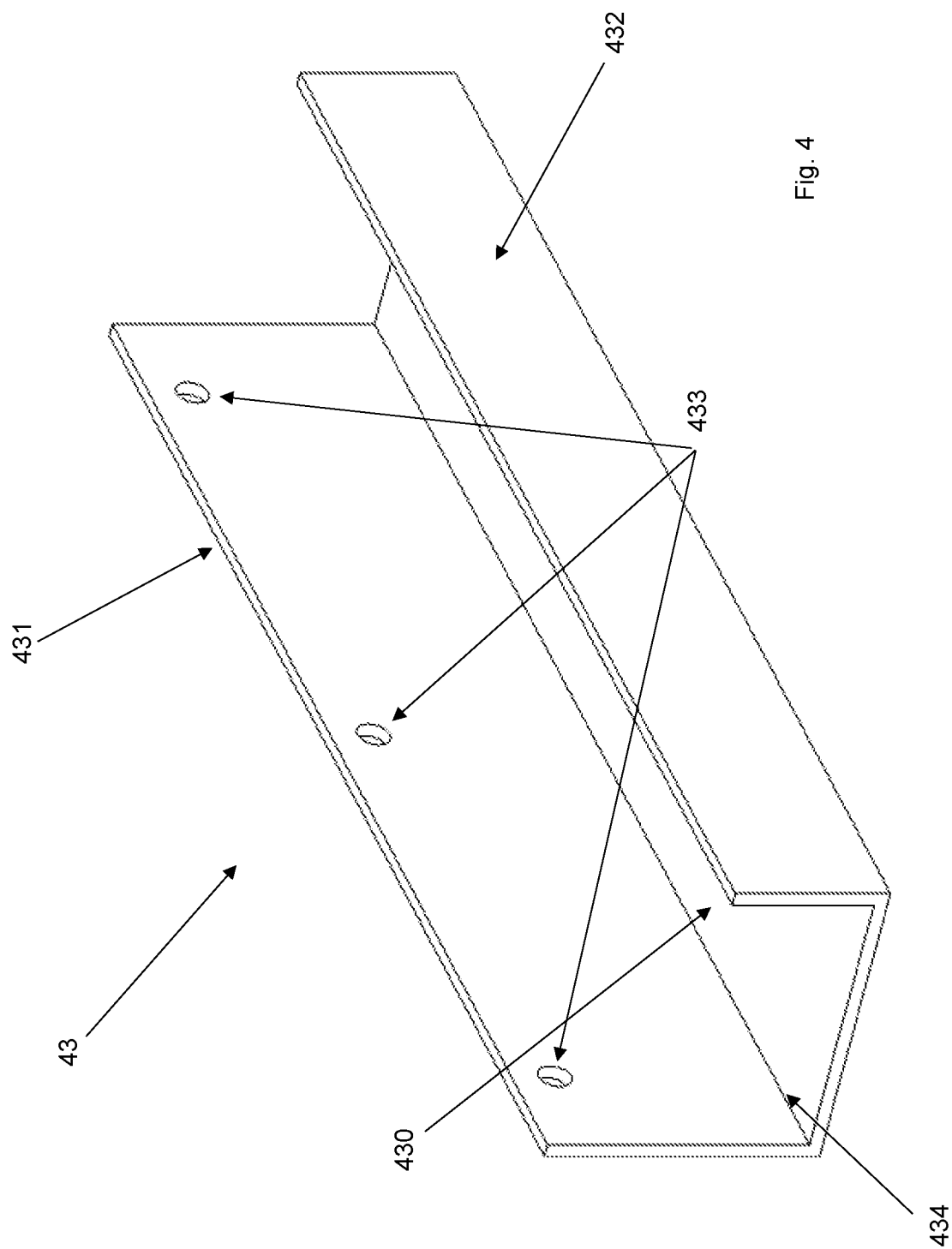
FIG. 4 shows a perspective view of a detail of the photovoltaic system.

The technical task underlying the concepts of the present disclosure is to provide a photovoltaic system which obviates the drawbacks as described in the background among other drawbacks. In some embodiments, it is an object of the present disclosure to provide a photovoltaic system which has the maximum flexibility of use and versatility of use.

The defined technical task and the specified aims are substantially achieved by a photovoltaic system comprising the technical characteristics set forth in one or more of the appended claims and/or the current disclosure. Further characteristics and advantages of the present disclosure will become more apparent from the indicative and thus non-limiting description of an embodiment of a photovoltaic system as described in this disclosure.

A photovoltaic system is denoted in the appended figures by reference number 1. The photovoltaic system 1 comprises photovoltaic panels 2 arranged in a row comprising at least one first and a second photovoltaic panel 21, 22. The photovoltaic panels 2 allow the production of electric current. Conveniently, the photovoltaic system 1 can comprise several rows of photovoltaic panels. In the course of this discussion we will focus on a row of these photovoltaic panels, but what is described with reference to this row can also be repeated for any remaining rows.

The system 1 comprises support ballasts 3 supporting the photovoltaic panels 2. The photovoltaic panels 2 are constrained to the ballasts, for example by means of removable hooking systems. The ballasts in addition to offering a resistance to overturning also allow to support the photovoltaic panels. The photovoltaic panels 2 of the row (or more generally at least the first and the second photovoltaic panel 21, 22) are arranged inclined with respect to a horizontal plane. This is to better intercept the sun's rays. However, this is penalizing for wind resistance, especially if the wind comes from certain angles (typically if it blows from behind the photovoltaic panels).

The system 1 comprises a connection system 4 for the mutual connection of at least one group of said ballasts. This is to improve resistance to overturning due to wind and to increase structural stiffness.

The connection system 4 comprises a first fairlead conduit 41. Conveniently it is made of concrete, typically vibrated and pre-stressed. The connection by means of concrete elements implies that this component is not subject to deformation. It also does not rust. Furthermore, the structural stiffening element also allows to define a housing for the transit of electrical cables (for the passage of electric current generated by the panel and/or for signal input to or from the photovoltaic panel). Conveniently, the first fairlead conduit 41 rests (In some embodiments it is laid down) on the ground (flooring, ground, etc.).

The first fairlead conduit 41 has a prevalent longitudinal extension. Conveniently, this first conduit 41 has a longitudinal extension greater than 70 centimetres. In the preferred solutions it has a longitudinal extension equal to 95 or 160 or 185 centimetres. Conveniently, the first conduit 41 has a groove 410 facing upwards. This groove 410 allows housing the cables. Conveniently, this groove 410 extends along the entire longitudinal extension of the first conduit 41. The groove 410 opens up externally at the ends of the first conduit 41. This groove 410 is straight.

The first fairlead conduit 41 (or in any case the groove 410) comprises a bottom 411. A water drainage hole 412 extends from this bottom. This hole 412 passes through the bottom 411. Typically, this hole 412 serves to avoid stagnation of rainwater.

Optionally, a cover of the first fairlead conduit 41 may be present (but it is a completely optional feature and is not shown in the accompanying drawings). Typically this cover is made of plastic material. The cover covers the groove 410. In this way the entry of water, debris and dust is minimised.

The connection system 4 comprises a second fairlead conduit 42. The second conduit 42 is aligned with the first conduit 41. The first and the second conduit 41, 42 extend along the same straight line. In some embodiments, the first and the second conduit 41, 42 have a prevalent rectilinear extension along the same direction. In some embodiments, the straight line in which the longitudinal extension axes of the first and of the second conduit 41, 42 lie is the same. Conveniently, this second fairlead conduit 42 is also made of concrete. One or more of the characteristics described with reference to the first fairlead conduit 41 can also be repeated for the second fairlead conduit 42. Conveniently, the first fairlead conduit 41 extends between (In some embodiments it connects) two of said ballasts 3 which support the first photovoltaic panel 21. In some embodiments, the first fairlead conduit 41 covers the distance between the two ballasts 3 which support the first photovoltaic panel 21.

Conveniently, the second fairlead conduit 42 extends between (In some embodiments it connects) two of said ballasts 3 which support the second photovoltaic panel 22. In some embodiments, the second fairlead conduit 42 covers the distance between the two ballasts 3 which support the second photovoltaic panel 22. As exemplified in the accompanying figures, a ballast can help support both the first and the second photovoltaic panel 21, 22.

Conveniently, the connection system 4 comprises a connector 43 of the first and of the second fairlead conduit 41, 42. Conveniently, the connector 43 is constrained to a predetermined ballast 31. This predetermined ballast 31 is part of said group of ballasts 3. In some embodiments, said predetermined ballast is a ballast which supports both the first and the second photovoltaic panel 21, 22. The connector 43 comprises a channel 434 inside which both the first and the second fairlead conduit 41, 42 engage. Conveniently, the connector 43 is made of metal. In some embodiments, it has an anti-corrosion coating. For example, this coating comprises a zinc magnesium coating (typically zinc magnelis 6/10).

The connector 43 defines a channel in which the first conduit 41 protrudes from one end and the second conduit 42 from the other end. The channel of the connector 43 is in fact open at the ends.

Preferably the connector 43 is constrained on the predetermined ballast 31 by a threaded body that traverses said connector 43 and engages in said predetermined ballast 31. For example, this threaded body could be a stud provided with an end head and an at least partially threaded stem. However, it could also be replaced by other connection elements.

The connector 43 comprises a lower base 430 and a first and second side wall 431,432 that protrude upwards from the lower base 430. The first side wall 431 with respect to the second side wall 432 is higher and much closer to the predetermined ballast 31. The first and the second conduit 41, 42 suitably rest on the base 430. The first and the second side wall 431, 432 laterally constrain the first and the second conduit 41, 42.

The connector 43 has a prevalent longitudinal extension. However, the longitudinal extension of the connector 43 is lower than the longitudinal extension of the first conduit 41. The connector 43 comprises a plurality of holes 433 arranged on said first side wall 431. These holes 433 extend one after the other and are placed in three different positions along a longitudinal extension. Conveniently, the holes 433 are all at the same height. The threaded body passes through one of said holes 433.

At least one of said group of ballasts 3 comprises two substantially orthogonal sides 32, 33 having common ends and distanced ends. These sides can also be referred to as arms. The distanced ends are designed to support at least partially at least one of the first or second photovoltaic panel 21, 22. One of said two sides 32, 33 being on the ground, the connection system being hooked to the other (which preferably extends vertically).

Conveniently, this inclined side 34 protrudes from one of the two mutually orthogonal sides. In some embodiments, it protrudes downwards from the side with vertical extension. Optionally, the group of ballasts 3 could be shaped (solution not illustrated) as a triangular or trapezoidal element (preferably it is shaped as a right triangle or right trapezoid).

The first and the second panel 21, 22 face an area 7 in front of the system 1. The connection system 4 extends parallel to the row defined by the photovoltaic panels 2 and are located in a rear area 6 of the system 1.

The connection system 4 comprises a modular structure which extends along the same straight line parallel to the row of photovoltaic panels. In some embodiments, they comprise an alternation of a component having the characteristics of (preferably equal to) said first conduit 41 and a component having the characteristics of (preferably equal to) said connector 43. In this way they define a rectilinear structure at the ends of which there are two connectors. A corresponding connector is associated with each ballast 3. Each photovoltaic panel is associated with a corresponding conduit.

In the solution exemplified in the accompanying figures, the first and the second photovoltaic panel 21, 22 are consecutive. They are supported by three of said ballasts 3. One of said ballasts 3 is in common with both the first and the second photovoltaic panel 21, 22. Each of said three ballasts 3 is connected to a corresponding connector which defines a channel. The first conduit 41 extends between a first pair of these connectors. The second conduit 42 extends between a second pair of said connectors. The first and the second pair of connectors have a common connector (which is intermediate and in which both the first and the second conduit 41, 42 are engaged).

The present disclosure may achieve important advantages. For example, the disclosure may allow improving the stiffness of the photovoltaic system and exerting a more effective resistance to the overturning action exerted by the wind. It also makes it possible to extend the life of the system by reducing maintenance interventions.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present invention have been described in detail, it should be understood that the various changes, substitutions, and alterations could be made hereto without departing from the spirit and scope of the present invention.

The invention claimed is:

1. A photovoltaic system comprising:
    photovoltaic panels arranged in a row, the photovoltaic panels include at least a first photovoltaic panel and a second photovoltaic panel;
    support ballasts supporting the photovoltaic panels; and
    a connection system configured to mutually connect at least one group of said support ballasts, the connection system including:
        a first concrete fairlead conduit;
        a second concrete fairlead conduit aligned with the first concrete fairlead conduit; and
        a connector of the first and the second concrete fairlead conduit, the connector being constrained on a predetermined ballast.

2. The photovoltaic system according to claim 1, wherein the predetermined ballast is part of said group of ballasts, and said connector comprises a channel inside which both the first and the second concrete fairlead conduits engage.

3. The photovoltaic system according to claim 2, wherein said connector is constrained on said predetermined ballast by a threaded body that traverses said connector and engages in said predetermined ballast.

4. The photovoltaic system according to claim 3, wherein said connector comprises:
    a lower base; and
    a first and a second side wall that protrude upwards from the lower base, the first side wall being with respect to the second side wall nearer the predetermined ballast.

5. The photovoltaic system according to claim 4, wherein said connector has a prevalent longitudinal extension and comprises a plurality of holes arranged on said first side wall longitudinally one after the other, the threaded body traversing one of said holes.

6. The photovoltaic system according to claim 2, wherein said connector comprises:
    a lower base; and
    a first and a second side wall that protrude upwards from the lower base, the first side wall being with respect to the second side wall nearer the predetermined ballast.

7. The photovoltaic system according to claim 2, wherein said connector is made of metal material.

8. The photovoltaic system according to claim 1, wherein the first concrete fairlead conduit comprises:
    a bottom; and
    a drainage hole for water being placed on the bottom.

9. The photovoltaic system according to claim 1, further comprising a cover that is located over the first concrete fairlead conduit.

10. The photovoltaic system according to claim 1, wherein at least one of said group of said support ballasts comprises two sides that are substantially orthogonal having common ends and distanced ends, said distanced ends are designed to support at least partially one of the first or the second photovoltaic panels and one of said two sides of the at least one of said group of said support ballasts being on the ground, the other being hooked to the connection system.

11. The photovoltaic system according to claim 1, wherein the first and the second photovoltaic panels face an area in front of the photovoltaic system and said connection system extending parallel to the row defined by the photovoltaic panels and being located in a rear area of the photovoltaic system.

12. The photovoltaic system according to claim 1, wherein the predetermined ballast is a ballast which supports both the first and the second photovoltaic panel.

13. The photovoltaic system according to claim 1, wherein the first concrete fairlead conduit has a groove facing upwards, the system further comprising electrical cables housed in the groove, the electrical cables configured for passage of electric current generated by one or more of the photovoltaic panels and/or for signal input to and/or from one or more of the photovoltaic panels.

* * * * *